V. SHEARER.
GREASE CUP.
APPLICATION FILED DEC. 12, 1914.

1,140,488.

Patented May 25, 1915.

WITNESSES:
V. Earle Garlick
Ruth M. W. Koger

INVENTOR
Vance Shearer
BY
Chamberlain & Newman
ATTORNEYS

THE NORRIS PETERS CO., PHOTO-LITHO., WASHINGTON, D. C.

UNITED STATES PATENT OFFICE.

VANCE SHEARER, OF BRIDGEPORT, CONNECTICUT.

GREASE-CUP.

1,140,488.  Specification of Letters Patent.  Patented May 25, 1915.

Application filed December 12, 1914. Serial No. 876,782.

*To all whom it may concern:*

Be it known that I, VANCE SHEARER, a citizen of the United States, and resident of Bridgeport, in the county of Fairfield and State of Connecticut, have invented certain new and useful Improvements in Grease-Cups, of which the following is a specification.

My invention relates to stationary grease cups for machinery bearings and is designed for stationary attachment to the parts to be lubricated as for instance automobile bearings.

The purpose of the invention is to provide an improved form of grease cup that is adapted to be secured to a bearing and so constructed that it can be filled and refilled from time to time without removing the cap or any of its parts from the bearing; further to provide means for forcing the grease from the cup into the bearing as required, and to construct the cup in a way which will make it apparent to the operator when the same has been exhausted of its grease; further to provide a removable outer end cap for the cup and in which the plunger screw is carried and whereby the cap and plunger may be removed as occasion may require.

As will be noted the opening of the cup is closed by a rotary annular shield which encircles the outer surface of the cylindrical body portion of the cup and is provided with an opening of a size and shape corresponding with that through the side of the reservoir and whereby the two may be made to register by the rotation of the shield for the purpose of opening the cup to fill the same, and further whereby the cup may be closed by the turning of the shield so as to again cover the opening in the side of the reservoir.

A further and important feature of the invention is to provide means to permit the grease from working out between the closure shield and body by the action of the plunger and to provide means for limiting the movement of the shield as well as to prevent it from shaking loose.

With the above and other minor objects in view the invention resides and consists in the novel construction, combination and arrangement of parts shown upon the accompanying drawings forming a part of this specification and of which—

Figure 1:
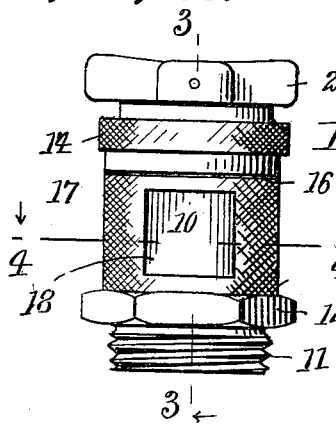
Figure 2:
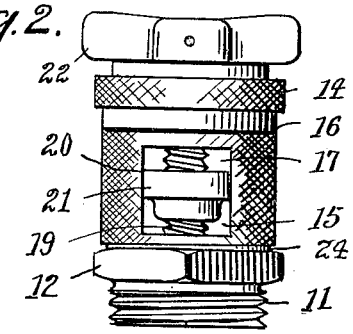
Figure 3:
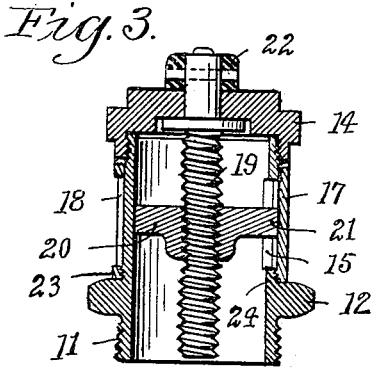
Figure 4:
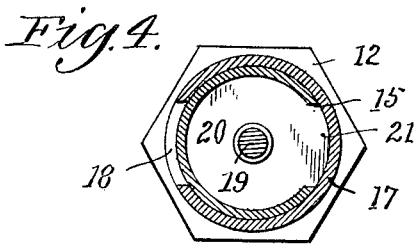
Figure 7:
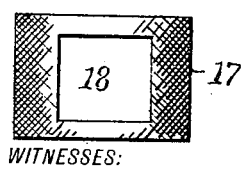
Figure 5:
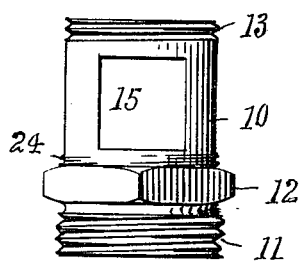
Figure 6:
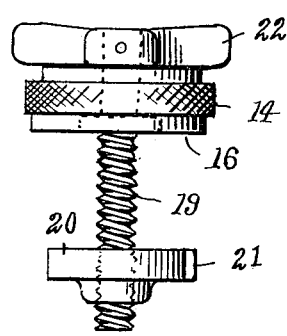

Figure 1 shows a side elevation of my improved form of grease cup complete. Fig. 2 is a further side view of the cup with the closure shield turned upon the body of the reservoir to open the latter. Fig. 3 is a central vertical longitudinal section taken on line 3—3 of Fig. 1. Fig. 4 is a horizontal sectional plan view of the cup shown and taken on line 4—4 of Fig. 1. Fig. 5 is a detail and separate side view of the cylindrical body or reservoir of the cup. Fig. 6 is a detached side view of the removable end closure cap, operating screw and plunger, as they appear when removed from the top end of the reservoir, and Fig. 7 is a detached side view of the rotatable closure jacket.

Referring in detail to the characters of reference marked upon the drawings 10 represents the main body or reservoir of my improved grease cup and which as will be noted is of a general cylindrical form having a bore through it from end to end of uniform diameter. The periphery of the lower end portion of this body is provided with threads 11 for the attachment of the cup to a bearing. Adjacent to these threads is also formed upon the periphery of the reservoir a flange 12 the face of which is milled down to form shoulders for the engagement of a wrench for the attachment of the reservoir to a bearing. The periphery of the upper end portion of the reservoir is also threaded as at 13 for the attachment of the closure cap 14. An elongated opening 15 is formed in the side of the reservoir intermediate of the shouldered flange and the annular threads 13 which not only forms an opening through which the cup may be filled with grease, but also serves as a guide for the piston to prevent it from turning. The closure cap is provided with an inner annular thread to engage the threads 13 of the reservoir and thus serve to overlap the said cylindrical body portion and form an annular shoulder 16 around the outside of the reservoir at a specific distance from the shouldered flange 12 formed around the outside of the lower portion of the reservoir.

A rotatable closure jacket 17 is fitted upon the outer side of the reservoir and between the before mentioned shoulders 16 of the closure cap and flange 12 of the reservoir and is further provided with an opening 18 that is shaped to register with the opening 15 in the side of the reservoir so that when the jacket 17 is turned to the right to its stopping point to expose the opening of the reservoir and when turned back will be closed and secured. The lower end portion of this jacket is provided with an internal thread 23 that engages a corresponding thread 24 encircling the reservoir. The purpose of this threaded engagement of the jacket and reservoir is to draw the lower annular edge of the jacket down tight against the flange of the reservoir when the cup is closed to prevent the leakage of grease therepast as a result of the force of the operation of the piston and for the further purpose of limiting the rotary movement of the jacket. In practice the clearance between the ends of the jacket is but a fraction of an inch and only sufficient to allow about a one-half turn of the jacket upon the reservoir.

An adjusting screw 19 which has its bearing in the closure cap is held therein against longitudinal movement and provided with a winged head 22 to permit of its manipulation to adjust the piston 20. The reservoir of the screw extends down through the center of the body of the grease cup and engages the piston 20 which is sized and shaped to engage the base of the reservoir and is provided with a short extension 21 to enter and fit the side opening 15 of the reservoir and whereby the piston is guided longitudinally in the reservoir and prevented from turning. This form of piston also serves to insure the movement of the grease downward in and along the line of the side opening in a way to prevent the grease from working up into the upper part of the reservoir. This extension of the piston further serves to abut the end edges of the elongated opening 15 in a manner to limit the movement of the piston within the reservoir.

From the foregoing construction it will be noted that the filling of my device would be effected by turning the screw back sufficient to run the piston up to its top position or slightly above that shown in Fig. 2 and so that the top edge of the piston would engage the upper edge of the opening. Then the closure jacket would be turned to the right upon the reservoir and its thread until the opening 18 of the jacket was brought to register with that of the reservoir. Thus the device would be opened and ready for the reception of grease which would be fed into the opening below the piston. Thereafter the closure jacket 17 would again be turned to the left and down to close the opening 15 and to bring the hollow edge of the jacket up tight against the flange 12. The screw 19 would thus be given a few turns to bring such pressure to bear upon the grease as would be required to feed it into the bearing (not shown).

The foregoing invention, as will be noted, thus provides a grease cup which can be filled and refilled from time to time without detaching any of its parts and which also includes means as for instance the piston and screw for forcing the grease down into the bearing to which it is attached and further provides a cup which if occasion requires can be disassembled by simply removing the top cap without detaching the body of the cup from the bearing. It will further be noted that my cup does not include any loose or detachable parts that are liable to become detached, shake off or be lost.

Having thus described my invention what I claim and desire to secure by Letters Patent is:—

1. In a stationary grease cup of the class described, the combination of a cylindrical reservoir having an opening in one side and an annular flange around each peripheral end portion, a rotatable jacket mounted upon the outside of the reservoir between the two said flanges and having an opening to register with that in the side of the reservoir, said jacket being threadably attached to the said body of the reservoir in a manner to cause the edge of the jacket to bind against the flange when in a closed position.

2. In a stationary grease cup of the class described, the combination of a cylindrical reservoir having an opening in one side, a shouldered flange around its periphery below the opening, an adjustable screw journaled in the end of the body, a piston fitted in the reservoir and its opening and engaged by the screw and adapted to be moved up and down by the said screw, a rotatable jacket mounted upon the outside of the reservoir and having an opening to register with that of the side of the reservoir, and means to cause the jacket to move longitudinally when the same is turned upon the body.

3. In a stationary grease cup of the class described, the combination of a cylindrical reservoir having an opening in one side and an annular flange around each peripheral end portion, a rotatable jacket mounted upon the outside of the reservoir between the two said flanges and having an opening to register with that in the side of the reservoir, said jacket being threadably attached to the said body of the reservoir in a manner to cause the edge of the jacket to bind against one of the said flanges when in a closed position and against the other when in an open position, an adjustable screw journaled in the end of the body and a piston fitted in the reservoir and its opening and engaged by the screw and adapted to be moved up and down by the said screw.

4. In a stationary grease cup of the class described, the combination of a cylindrical reservoir portion having an elongated opening in one side, a shouldered flange around its periphery below the opening and adapted for attachment to a bearing, a closure cap to cover one end of the reservoir and to overlap its periphery to form a shoulder, an adjusting screw journaled in the cap, a piston fitted in the reservoir and its opening and engaged by the screw and adapted to be moved up and down by the said screw, and a rotatable jacket mounted upon the outside of the reservoir between the shoulders of the cap and flange and having an opening to register with that of the side of the reservoir.

5. In a stationary grease cup of the class described, the combination of a cylindrical reservoir portion having an elongated opening in one side, a shouldered flange around its periphery below the opening and screw threads upon its opposite peripheral end portions one for the attachment of the cup to a bearing and the other for the attachment of a closure cap, a closure cap to engage the latter threads and overlapping the periphery of the reservoir to form a shoulder, an adjusting screw journaled in the cap, a piston fitted in the reservoir and its opening and engaged by the screw and adapted to be moved up and down by the said screw, and a rotatable jacket mounted upon the outside of the reservoir between the shoulders of the cap and flange and having an opening to register with that of the side of the reservoir.

Signed at Bridgeport in the county of Fairfield and State of Connecticut this 8th day of December A. D., 1914.

VANCE SHEARER.

Witnesses:
C. M. NEWMAN,
RUTH M. W. KOGER.

Copies of this patent may be obtained for five cents each, by addressing the "Commissioner of Patents, Washington, D. C."